(No Model.)  4 Sheets—Sheet 1.

J. B. G. A. CANET.
BREECH MECHANISM FOR ORDNANCE.

No. 539,974.  Patented May 28, 1895.

Witnesses:—

Inventor
J. B. G. A. Canet,
By F. C. Somes
Attorney.

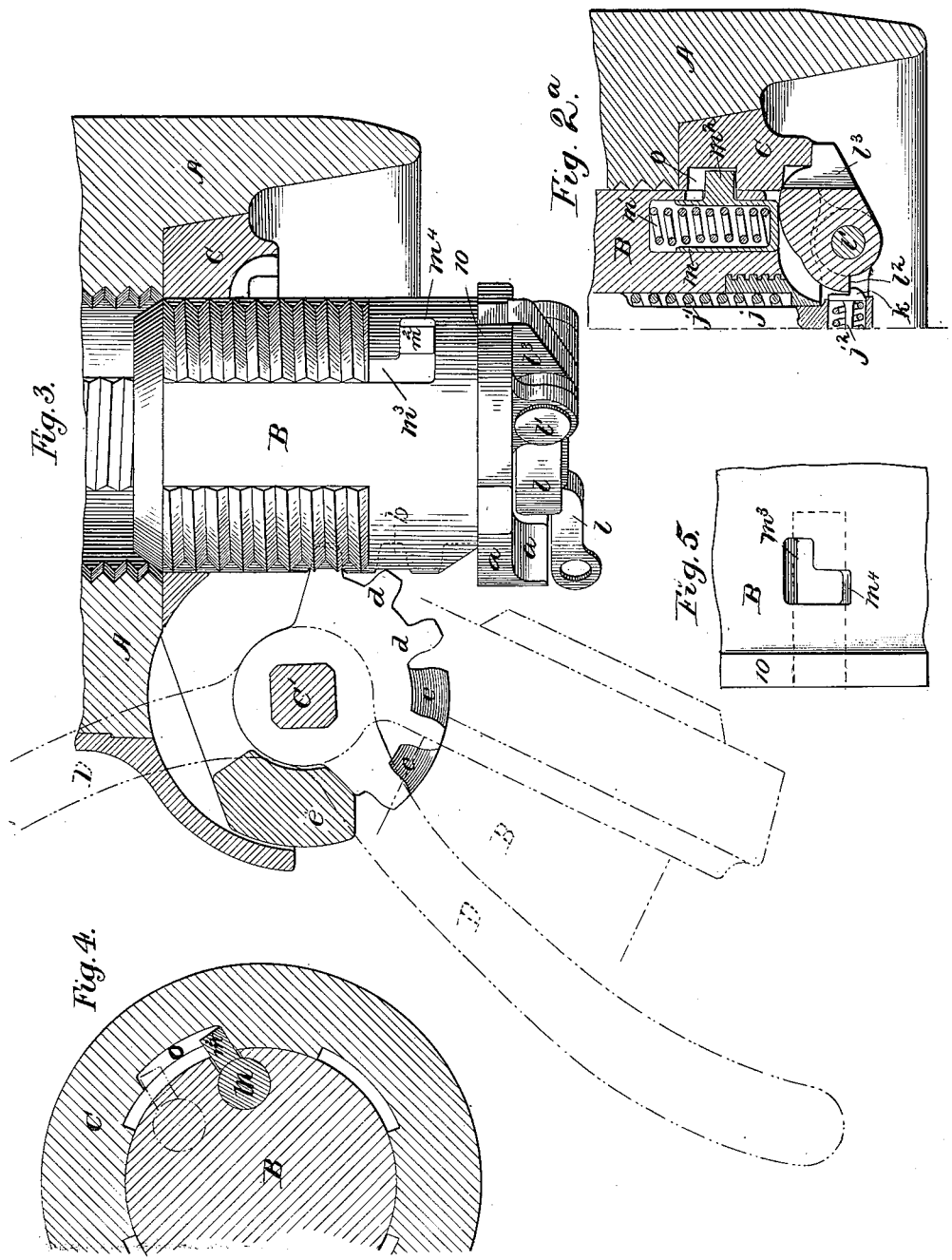

(No Model.) 4 Sheets—Sheet 3.
J. B. G. A. CANET.
BREECH MECHANISM FOR ORDNANCE.
No. 539,974. Patented May 28, 1895.
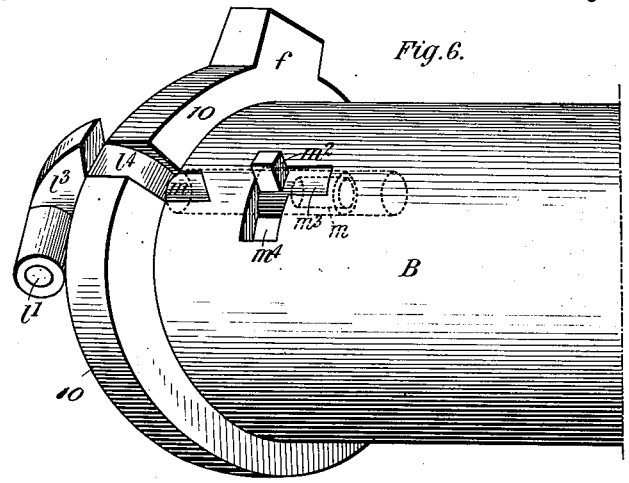
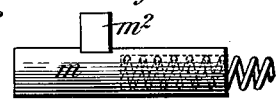
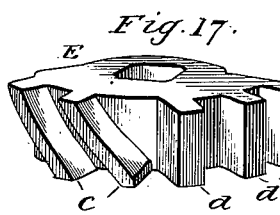
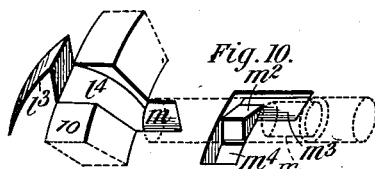
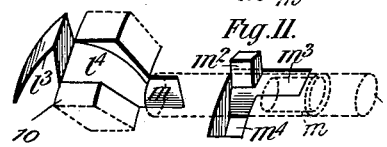
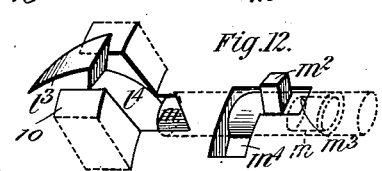
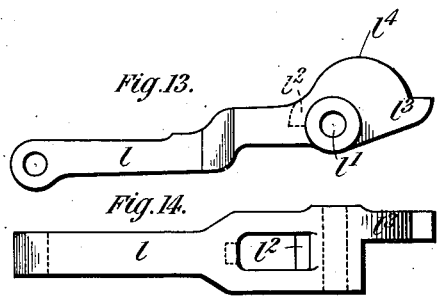
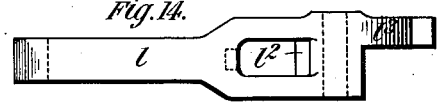

(No Model.)  4 Sheets—Sheet 4.

J. B. G. A. CANET.
BREECH MECHANISM FOR ORDNANCE.

No. 539,974.  Patented May 28, 1895.

UNITED STATES PATENT OFFICE.

JEAN BAPTISTE GUSTAVE ADOLPHE CANET, OF PARIS, FRANCE.

BREECH MECHANISM FOR ORDNANCE.

SPECIFICATION forming part of Letters Patent No. 539,974, dated May 28, 1895.

Application filed January 2, 1892. Serial No. 416,849. (No model.) Patented in France December 26, 1890, No. 180,578, and in England July 13, 1891, No. 11,858.

*To all whom it may concern:*

Be it known that I, JEAN BAPTISTE GUSTAVE ADOLPHE CANET, a citizen of the Republic of France, residing at 91 Avenue Malakoff, Paris, France, have invented certain new and useful Improvements in Breech Mechanism for Guns, (for which I have obtained a certificat d'addition in France to Patent No. 180,578, such certificat d'addition bearing date December 26, 1890, and a patent in Great Britain bearing No. 11,858, dated July 13, 1891,) of which the following is a specification.

This invention relates to breech mechanism of the slotted screw system.

The object of the invention is to provide a gun which permits the breech block to be operated with great rapidity to open and close the breech.

The invention consists principally in a breech mechanism for opening and closing the breech in which the breech block is provided with plain and worm teeth meshing with similar teeth on a sector pivoted to the gun, which breech block is turned to release the screw threads, drawn out and swung into open position by a single pull of an operating lever.

It also consists in safety mechanism for preventing the firing lever being pulled when the breech block is in the breech, but before it is properly screwed home; and also to prevent the firing lever being operated when the breech block is out of the breech.

Figure 1:
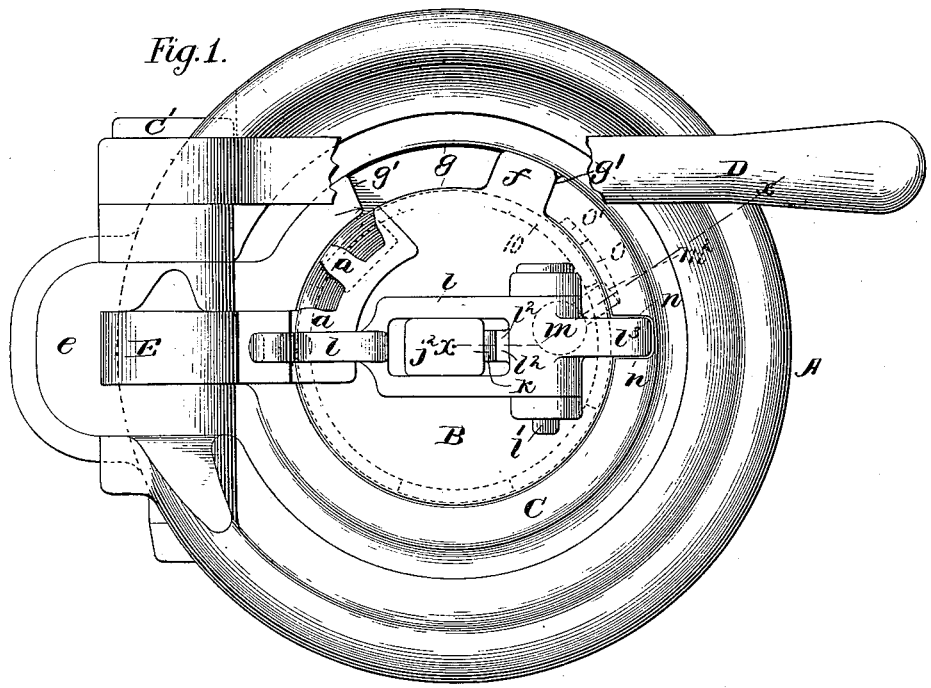
Figure 2:
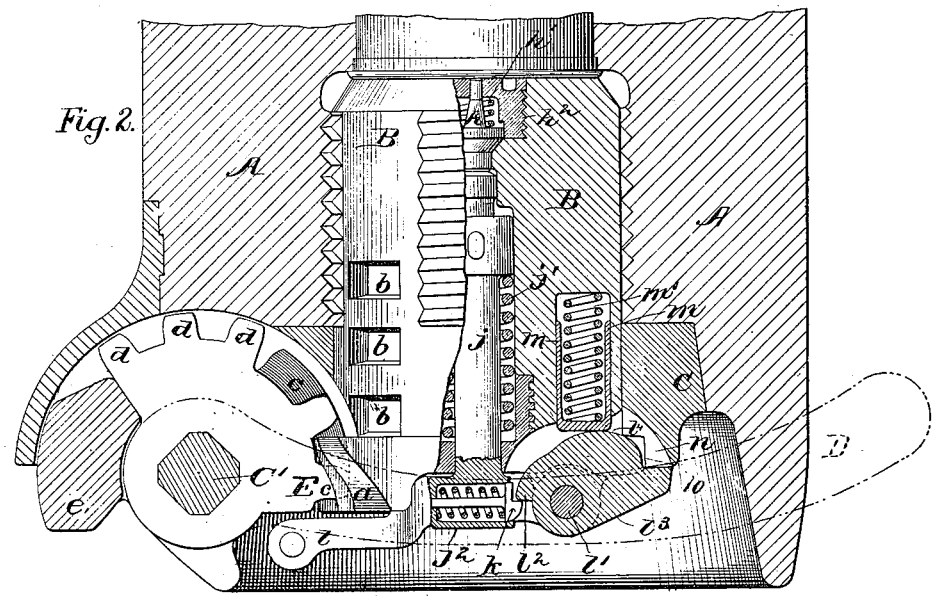
Figure 16:
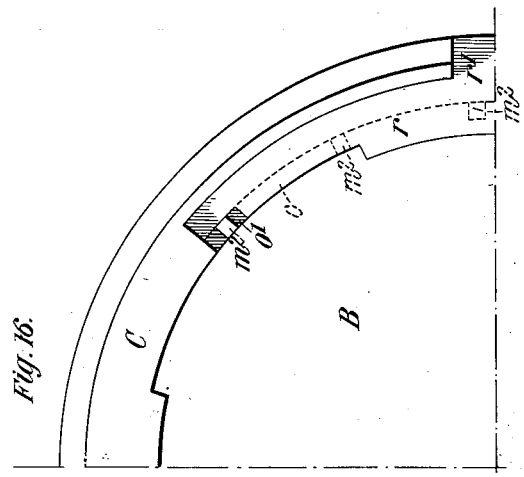
Figure 15:
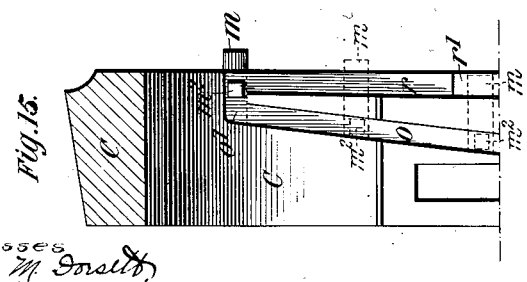

Referring to the accompanying drawings, Figure 1 is a rear elevation of a gun embodying my invention. Fig. 2 is a horizontal central section of the same, the breech being closed. Fig. 2ª is a section of half the breech-block on the line x x, Fig. 1. Fig. 3 is a horizontal central section on a somewhat smaller scale, the breech-block being withdrawn and ready to be swung away from the breech about the carrier-bracket pivot. Fig. 4 is a partial vertical section through the breech-block and carrier-ring, showing a locking device hereinafter described. Fig. 5 is a plan of a portion of the breech-block, showing the said locking mechanism. Fig. 6 is a perspective view of a portion of the breech-block, showing the safety mechanism hereinafter described, the parts being shown in the position they occupy when the breech is closed. Figs. 7, 8, and 9 are an end elevation, side elevation, and plan, respectively, of the safety bolt or pusher detached. Figs. 10, 11, and 12 are perspective views showing the safety mechanism in three different positions, Fig. 10 indicating the position of the parts before the breech-block is properly screwed home, Fig. 11 the position when the block is screwed home, and Fig. 12 when the firing-lever is pulled. Figs. 13 and 14 are plan and side elevations, respectively, of the firing-lever detached. Fig. 15 is a section, and Fig. 16 is a rear elevation, of a portion of the carrier-ring, showing the form of the grooves therein cooperating with the safety mechanism hereinafter described, the safety pusher-bolt being shown in three positions. Fig. 17 is a perspective view of the sector pivoted on the gun, showing the worm and rack-teeth.

Like letters and numerals of reference indicate corresponding parts throughout the drawings.

A is the gun.

B is the breech block.

C is the carrier ring, or bracket, which is hinged or pivoted to the gun at C', and D is the lever or handle for opening and closing the breech.

My improved mechanism is so constructed and arranged that a simple pull at the handle D performs all the operations required to open the breech. During the first part of the movement of the said handle the breech block is rotated and unlocked from the breech screw threads, during the second part of the movement of the handle the breech-block is withdrawn from the breech, and during the last part of the movement of the said handle the breech block and carrier bracket are together swung about the pivot axis of the latter away from the breech. By reversing the movement of the handle D the above operations are reversed and the breech is re-closed.

Referring to Figs. 1 to 5 the breech screw B is provided at its rear end with a collar 10 on a portion of which a sector *a* having worm teeth is formed. *b, b* are plain or straight rack teeth formed in one of the plain sections or recesses of the breech screw parallel with the axis thereof. Upon the hinge C' of the carrier bracket is fixed a toothed sector E having worm teeth *c*, for engaging the corresponding worm teeth of the sector *a* so that by turning the shaft C' the breech block can be rotated through the required angle for locking and unlocking it from the breech. Following the worm teeth c of the sector E are plain or straight teeth d adapted to engage the straight teeth b on the breech-block. The hand lever B is fixed upon the spindle C'. e is a stop on the hinge of the carrier bracket C for limiting the turning movement of the sector E about its axis.

f Fig. 1 is a stop pin projecting radially from the breech block collar 10 and working in a slot or recess g in the carrier bracket C. The ends $g'$, $g'$ of the said slot serve to limit the angle through which the breech block can turn.

To open the breech, the hand lever D is pulled outward toward the operator, and the sector E thereby turned about its axis, thus through the worm teeth c, a, rotating the breech block and unlocking the same from the breech.

The rotary movement of the breech-block is as above stated limited by the stop pin f, abutting against the end of the slot $g'$. At this moment the first of the straight teeth d on the sector engages the first of the straight teeth b on the breech block, and the continued pull on the hand lever D therefore operates to slide the breech block out of the breech. When the breech block has been sufficiently withdrawn, the rear edge of the sector E abuts against the edge of the hinge stop e and further rotation of the sector relatively to the carrier ring is thereby prevented. The continued pull on the hand lever D now causes the bracket C to turn about its pivot C' and thus carry the breech block clear away from the breech. I may provide any suitable locking bolt for locking the breech block to the carrier bracket immediately the former is fully withdrawn from the breech and the carrier bracket begins to turn which bolt is arranged to be released upon re-closing the breech.

$h$ is the firing pin which is mounted in a recess in the forward end of the breech-block, and is pressed back into the said recess by a spring $h'$.

$h^2$ is a nut for retaining the spring $h'$ in position.

$j$ is the hammer which traverses the center of the breech-block.

$j'$ is the main spring. At the rear end of the hammer is formed a box $j^2$ which carries a spring catch $k$ that projects radially from the said box.

$l$ is the firing lever hinged at $l'$ to the rear end of the breech block.

$l^2$ is a lip or projection formed on the said lever $l$ for engaging with the catch $k$. The tail $l^3$ of the lever $l$ is formed with a rounded face $l^4$.

$m$ is a spring actuated presser which is mounted in a recess $m'$ in the end of the breech block. The said presser acts upon the rounded face $l^4$ of the firing lever tailpiece and operates to return the said lever upon the release thereof after firing.

To fire the gun, the lever $l$ is pulled outward whereupon the hammer is first drawn back or cocked by the projection $l^2$ acting on the catch $k$ and then as the movement is continued the said projection escapes past the said catch. The hammer $j$ upon being thus released is forced forward by its spring $j'$ and strikes the firing pin $h$. Upon the release of the firing lever after firing it is returned to its initial position by the spring actuated presser $m$ and caused to re-engage with the catch $k$.

To prevent the gun being fired until the breech is properly closed, I provide an open breech safety-lock and a closed breech safety-lock one operating to prevent the firing lever being pulled when the breech block is out of the breech and the other preventing the said lever being pulled in case the breech block although in the breech is not properly screwed home. The latter safety device consists in arranging the tail $l^3$ of the firing lever so that it is in close contact with the rear face of the carrier ring when the breech block is inserted in the breech, and providing a slot $n$ in the said ring in such a position that when the breech block is properly screwed home the said tail $l^3$ of the firing lever is opposite the said slot so that said tail piece can enter said slot when the firing lever is pulled. Consequently the lever can be pulled in this position and the gun fired. The other safety device is constructed as follows: The pusher $m$ is made with a lug or pin $m^2$, Figs. 6 to 12, that projects radially through a slot formed in the breech block and enters a circumferential groove or recess $o$, Figs. 2ª and 4 in the carrier ring C. This groove has the same inclination or pitch as the screw threads of the breech-block. The said slot in the breech block is L-shaped being formed with a longitudinal part $m^3$ and a circumferential part $m^4$. See Figs. 3, 5, 6, and 10 to 12. The groove or recess $o$ in the carrier ring is somewhat shorter than the distance through which surface of the breech-block moves when the breech-block is rotated to lock or unlock the same. When the breech-block is properly closed the pin $m^2$ is opposite the longitudinal part $m^3$ of the slot in the breech-block and in that position the firing lever can be pulled. Upon rotating the breech-block to unlock the same, the pin $m^2$ is arrested by the end of the groove $o$ and thereby turned into the circumferential part $m^4$ of the aforesaid slot; in which position the firing lever cannot be pulled because the pusher $m$ is prevented from longitudinal movement. It is thus seen that immediately the breech-block is turned a very little so as to bring the tail $l^3$ of the firing lever out of register with the slot $n$ the gun cannot be fired, and when the breech-block is fully rotated and unlocked from the screw threads then the pusher $m$ is locked and consequently the firing lever cannot be pulled even when the breech-block is out of the breech. When re-locking the breech-block, the lug $m^2$ is turned back by the end of the slot $o$ to its initial position opposite the longitudinal slot $m^3$, in which position the firing lever is free to be operated. The slot $o$ in the carrier ring is formed at one end with a part $o'$ Fig. 1 which is parallel with the axis of the gun so that when the breech-block is unscrewed the pin $m^2$ is opposite the part $o'$ and does not therefore interfere with the sliding of the breech block through the carrier ring.

The above described improvement is applicable to field and naval guns and generally to the closing of any breech screw having interrupted screw threads the object of the said mechanism being to enable such breech screws to be operated with great rapidity to open and close the breech.

What I claim is—

1. In a breech loading gun, the combination of a breech having interrupted screw threads, a breech block also having interrupted screw threads and provided with rack teeth on one of the plain sections thereof, a sector on the rear end thereof having worm teeth, a carrier hinged to the gun, a pivoted sector provided with plain teeth for engaging said rack teeth and with worm teeth for engaging the worm teeth of the breech block sector, a handle pivoted to the gun, and a stop for limiting the rotation of the sector.

2. In a breech loading gun, the combination of a breech block provided with a collar, a projecting stop pin on said collar, rack teeth on said breech block, a sector having worm teeth formed on the rear end of the breech block, a carrier hinged to the gun and provided with a slot in which said stop pin moves, a pivoted sector provided with plain and worm teeth, and handle pivoted on the gun for operating said breech block and carrier.

3. In a breech loading gun, the combination of a breech having interrupted screw threads, a breech block also having interrupted screw threads, and provided with rack teeth on one of the plain sections thereof, a sector formed at the rear end thereof having worm teeth, a carrier hinged to the gun, a sector secured on the pivot pin of the carrier and provided with plain and worm teeth, a handle pivoted to the gun, and a stop for limiting the rotation of the sector.

4. In a breech loading gun, the combination of a breech having interrupted screw threads, a breech block also having interrupted screw threads and provided with worm and rack teeth, a pivoted sector having plain and worm teeth adapted to mesh with the plain and worm teeth on the breech block, a pivoted carrier, a firing pin, a hammer for striking said firing pin, a firing lever for said hammer, said hammer being provided at its rear end with a box, a spring catch projecting radially from said box, and mechanism for operating said hammer to fire the gun.

5. In a breech loading gun, the combination of a breech having interrupted screw threads, a breech block also having interrupted screw threads and provided with worm and rack teeth, a pivoted sector having plain and worm teeth adapted to mesh with the plain and worm teeth on the breech block, a pivoted carrier, provided with a transverse slot, a firing pin, a hammer for striking said firing pin, a firing lever for said hammer, a tail piece pivoted to said firing lever and adapted to enter said transverse slot in the carrier to permit the firing lever being pulled only when the breech block is properly screwed home.

6. In a breech loading gun, the combination of a breech having interrupted screw threads, a breech block also having interrupted screw threads and provided with worm and rack teeth, said breech block being also provided with a slot, a pivoted sector having plain and worm teeth adapted to mesh with the plain and worm teeth on the breech block, a pivoted carrier provided with a circumferential groove, a firing pin, a hammer for striking said firing pin, a firing lever for said hammer, and an open breech safety lock for preventing the firing lever from being operated while the breech block is out of the breech, comprising a spring pusher having a lug, said lug working in the slot of said breech block and the circumferential groove of the carrier.

7. In a breech loading gun, the combination of a breech having interrupted screw threads, a breech block also having interrupted screw threads and provided with worm and rack teeth, said breech block being provided with a slot, a pivoted sector having plain and worm teeth adapted to mesh with the rack and worm teeth on the breech block, a pivoted carrier provided with a circumferential groove, a firing pin, a hammer for striking said firing pin, a firing lever for said hammer provided with a tail piece, and mechanism for preventing the firing lever from being operated while the breech block is out of the breech, comprising a spring pusher having a lug, said lug working in the slot of said breech block and the circumferential groove of the carrier.

8. In a breech loading gun, the combination of a breech having interrupted screw threads, a breech block also having interrupted screw threads and provided with worm and rack teeth and with a slot, a pivoted sector having plain and worm teeth adapted to mesh with the rack and worm teeth on the breech block, a pivoted carrier provided with a transverse slot and a circumferential groove, a firing pin, a hammer for striking said firing pin, a firing lever for said hammer, a closed breech safety lock for preventing the firing lever being pulled when the breech block is in the breech, but before it is properly screwed home comprising a tail piece pivoted to said firing lever and adapted to enter said transverse slot in the carrier to permit the firing lever being pulled when the breech block is properly screwed home, and an open breech safety lock or preventing the firing lever from being operated while the breech block is out of the breech, comprising a spring pusher having a lug, said lug working in the slot of said breech block and the circumferential groove of the carrier.

9. In a breech loading gun, the combination of a breech having interrupted screw threads, a breech block also having interrupted screw threads and provided with worm and rack teeth and also with a slot, a pivoted sector having plain and worm teeth adapted to mesh with the plain and worm teeth on the breech block, a pivoted carrier provided with a circumferential groove, mechanism for operating said breech block and carrier, a firing lever pivoted to the breech block and provided with a tail piece, and an open breech safety lock for locking the firing lever when the breech block is entirely out of the breech, comprising a spring pusher provided with a lug, said lug working in the slot of said breech block and the circumferential groove of the carrier.

10. In a breech loading gun, the combination of the breech block a carrier provided with a transverse slot, a hammer mounted on the rear of the breech block provided with a spring catch, a spring retracted firing pin, a firing lever pivoted to the breech block and adapted to engage the spring catch to cock and release the firing hammer, and a tail piece secured on the firing lever, the inner face of said tail piece being in close proximity with the rear face of the carrier when the breech is closed and adapted to enter the transverse slot in the carrier when the breech block is screwed home.

11. In a breech loading gun, the combination of a breech block provided with an L-shaped slot, a carrier mounted on the gun, said carrier being provided with a circumferential slot and with a longitudinal slot at the end of said circumferential slot, a firing lever pivoted to the breech block and provided with a tail piece, and means for locking the firing lever when the breech block is unscrewed.

12. In a breech loading gun, the combination of a breech block provided with an L-shaped slot, a carrier mounted on the gun, said carrier being provided with a circumferential slot and with a longitudinal slot at the end of said circumferential slot, a firing lever pivoted to the breech block and provided with a tail piece, and means for locking the firing lever when the breech block is unscrewed comprising a spring presser mounted in the breech block adapted to press against the tail piece, said presser being provided with a lug adapted to project through the L-shaped slot in the breech block and engage the circumferential and longitudinal slots in the carrier, said circumferential slot being of such length as to prevent the lug from having the full rotary movement of the breech block.

13. In a breech loading gun, the combination of a breech block provided with an L-shaped slot, a carrier mounted on the gun, said carrier being provided with a circumferential slot and with a longitudinal slot at the end of said circumferential slot, and a transverse slot, also in the carrier, a firing lever pivoted to the breech block provided with a tail piece, said tail piece being adapted to enter the transverse slot, a spring presser mounted in the breech block adapted to press against the tail piece, said presser being provided with a lug adapted to project through the L-shaped slot in the breech block and into the circumferential and longitudinal slots in the carrier, said circumferential slot being of such length as to prevent the lug from having full rotary movement of the breech block.

JEAN BAPTISTE GUSTAVE ADOLPHE CANET.

Witnesses:
ROBT. M. HOOPER,
W. P. BOYD.